Dec. 20, 1960  E. R. LOWE  2,965,384
DIAPHRAGM CHUCK
Filed March 10, 1960

INVENTOR.
EARL R. LOWE
BY Edward M. Apple
ATTORNEY

United States Patent Office 2,965,384
Patented Dec. 20, 1960

2,965,384

DIAPHRAGM CHUCK

Earl R. Lowe, Detroit, Mich.
(23001 Schroeder, East Detroit, Mich.)

Filed Mar. 10, 1960, Ser. No. 14,040

11 Claims. (Cl. 279—123)

This invention relates to diaphragm chucks and has particular reference to a chuck of that character, for use in holding gears so that machine work may be done thereon, although it also may be used to hold substantially any kind of work piece.

An object of the invention is to provide a chuck, which may be adjusted, so that it can be used to hold gears having a great variation in the number of teeth.

Another object of the invention is to provide a chuck, which is constructed and arranged to support any desired number of jaws, which jaws are easily attached to and detached from the chuck, and may be located in any radial position, on the chuck, for rapid spacing of the jaws.

Another object of the invention is to provide a device of the character indicated, which is constructed with locking means for preventing the flexing of the diaphragm, and for automatically locking the jaws, and for preventing the opening of the jaws by centrifugal force, when a work piece is being machined.

Another object of the invention is to provide a chuck with a diaphragm, having a concentric dovetail formed thereon, for adjustably supporting a plurality of jaws, with means to flex said diaphragm, and to cause said jaws to be rocked out of closed position, whereby a work piece may be quickly and easily removed from and returned to said jaws.

Another object of the invention is to generally improve diaphragm chucks and to provide a device of the character indicated, which is simple in construction, economical to manufacture, and efficient in use.

Another object of the invention is to provide a diaphragm chuck, which may be used for either gears, or other round work pieces, whereby it is possible to run any number of jobs on such work pieces by the simple expedient of only changing jaws.

In diaphragm chucks presently known to the public for holding gear work pieces, it is necessary to have different size jaw holding diaphragm assemblies, to accommodate gears having different numbers of teeth. Such diaphragm assemblies take time to attach and adjust, and it requires a substantial capital investment for such members in order to cover the usual range of gears. It is therefore an object of this invention to obviate the foregoing difficulties.

The foregoing, and other objects and advantages of the invention, will become more apparent as the description proceeds, reference being made from time to time from the accompanying drawing, forming part of the within disclosure, in which drawing.

Figure 1:
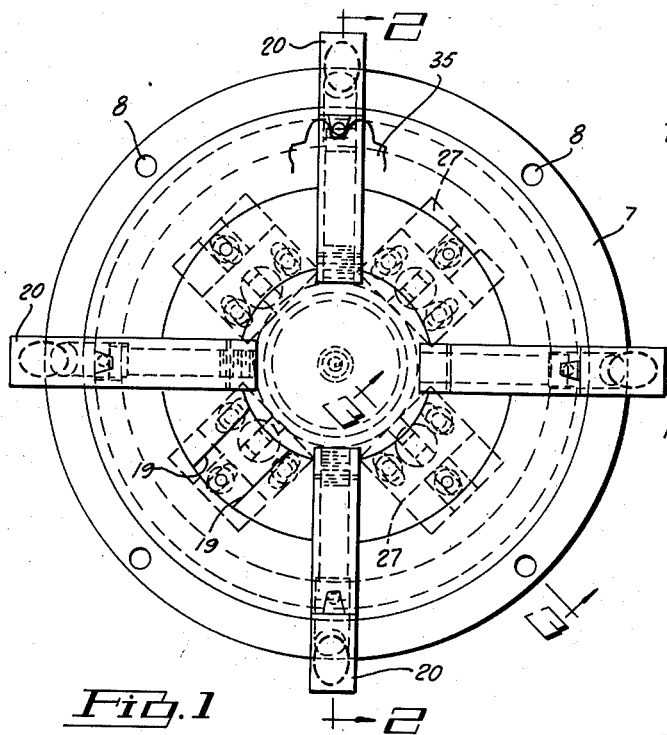
Fig. 1 is an elevational view of a diaphragm chuck embodying the invention.
Figure 2:
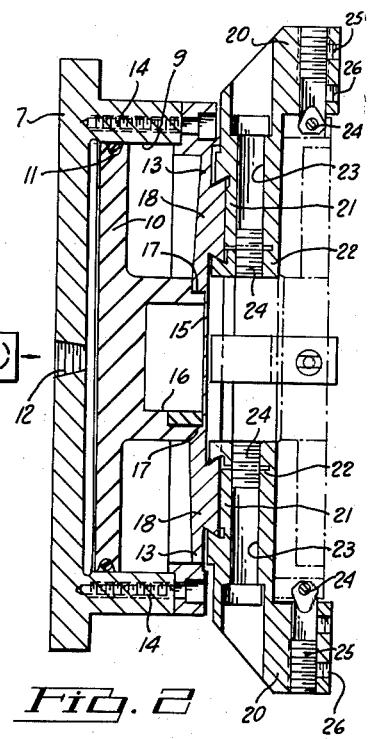
Fig. 2 is a section taken substantially on the line 2—2 of Fig. 1.

Referring now more particularly to the drawing, it will be understood that in the embodiment herein disclosed, the reference character 7 indicates the body of the chuck, which is provided with a plurality of openings 8, for receiving machine screws or the like whereby the device may be secured to the spindle of the grinding machine, or the like. The body 7 has a central bore 9 (Fig. 2), which serves as a cylinder in which is mounted a piston 10, which is sealed around the periphery as at 11, by means of a sealing ring. Air or hydraulic pressure is introduced to the cylinder 9, through the threaded bore 12. The air or hydraulic pressure causes the piston 10 to move to the right, as shown in Fig. 2. A metal diaphragm 13 is secured to the body member 7 by means of machine screws 14. The diaphragm 13 has a central opening 15, which communicates with a corresponding opening 16 formed in the piston 10. The diaphragm 13 has a shoulder 17, which is arranged to engage a corresponding shoulder formed at the leading end of the piston 10. This serves as a guide for the movement of the piston. Machined, or otherwise, formed integrally with the diaphragm 13, is a dovetail 18, which extends almost completely around the face of the diaphragm 13, except where it is slotted as at 19 (Fig. 1). The slot 19 (Fig. 1) permits a plurality of the jaws 20 to be introduced to the face of the diaphragm 13. In this embodiment, I have shown the use of four jaws 20. Each of the jaws 20 is provided with a dovetail slot 21 (Fig. 2) for receiving the dovetail 18 formed on the diaphragm 13. With this arrangement, any number of jaws 20 may be mounted on the dovetail of the diaphragm, and may be located at any radial position on the diaphragm 13, as may be desired or required by the number of teeth in the gear. This is an important feature of the invention, as it permits the chuck to handle gears having a wide variety of numbered teeth.

Each of the jaws 20 is slotted as at 22 (Fig. 2) and is provided with a bore 23, which has a threaded portion for receiving a machine screw 24, which is arranged to draw together the slotted portions of the jaws in order to secure them in the desired locations on the dovetail 18. The jaws 20 are also provided with a spherical member 24, a retainer 25, and set screws 26, all of which are more particularly disclosed in United States Patent 2,716,554, issued to me August 30, 1955, which structure forms no part of the within invention, except as combined with the other elements herein described. It will be understood that other means may be employed to lock the jaws to the dovetail ring.

In order to prevent the flexing of the diaphragm 13 and the opening of the jaws 20 by centrifugal force when the chuck is being rotated at high speed, I provide a plurality of centrifugal locks 27 (Figs. 1, 3 and 4) The locks 27 are in the form of rectangular weights, each of which is mounted for radial movement on the body 7, as hereinafter described.

Figure 3:
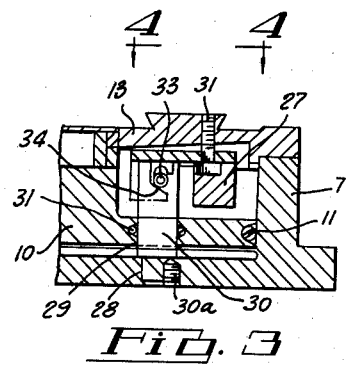
Fig. 3 is a fragmentary section taken substantially on the line 3—3 of Fig. 1.
Figure 4:
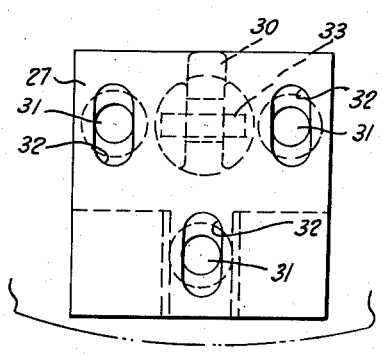
Fig. 4 is a plan view of one of the locking weights shown in Figs. 1 and 3.

As shown in Fig. 3, the body 7 and the piston 10 are provided with bores 28 and 29, in which is received a retainer pin 30, which is held in place by a set screw 30A and which is sealed, as at 31, with an O ring. Each locking weight 27 is mounted to the back of the diaphragm 13, by means of machine screws 31, or other suitable means. The locking weights 27 are slotted as at 32, to permit limited axial movement of the weights 27, with respect to the diaphragm 13. Each retainer pin 30 is provided with a cross pin 33, which engages inclined cam surfaces 34, formed as an integral part of the weight members 27. Upon the rotation of the chuck at high speed, the locking weights 27 will move outwardly in a radial direction, under the centrifugal force developed in the chuck, so that the cam faces 34 are brought into locking position with the cross pins 33.

This prevents the flexing of the diaphragm 13, and prevents the jaws from being opened during the rotation of the chuck. It will be understood that the dovetail ring hereinabove described also may be used for internal chucking, during which use, of course, it would not be necessary to use the centrifugal locks hereinabove described.

In Fig. 1, I show the chuck with a gear 35 secured in position by the jaws 20. With this chuck it is possible to hold different gear work pieces, having any number of teeth thereon, by simply adjusting the jaws to the proper spacing and position on the diaphragm. In production, the gears 35 may quickly be mounted in the chuck, and be removed from the chuck, by the simple expedient of flexing the diaphragm 13, by exerting pressure on the piston 10, through the air or hydraulic opening 12. As the center of the diaphragm 13 is moved to the right, as shown in Fig. 2, it causes a slight displacement of the inner ends of the jaws 20, releasing the grip of the jaws from the gear 35. With this type of chuck construction it is possible to run any number of production jobs by simply having different jaws for the chuck, and without the necessity of changing the diaphragm, and its mounting means.

It is believed that the operation of the device is obvious from the foregoing description.

Having described my invention, what I claim and desire to secure by Letters Patent is:

1. In a device of the character described in combination, a body member, a diaphragm attached to said body member, a piston in said body for flexing said diaphragm, a dovetail ring secured to said diaphragm, and a plurality of jaws adjustably secured to said ring.

2. The structure of claim 1, in which said ring has an opening therein for receiving and removing said jaws.

3. The structure of claim 1, including locking means for preventing the flexing of said diaphragm when in rotation.

4. The structure of claim 1, including locking means for preventing the flexing of said diaphragm when in rotation said last named means comprising, weights slideably mounted on elements carried by said diaphragm, said weights having slots and cam like surfaces for receiving fixed elements carried on said body member whereby to lock said weights to said body upon rotation of said device.

5. The structure of claim 1, including locking means for preventing the flexing of said diaphragm when in rotation, said last named means comprising a plurality of weights slideably mounted on machine screws secured to said diaphragm each of said weights having an extension with a cam surface formed thereon, said extension having a slot therein for receiving a pin secured to said body member, there being a cross pin on said pin arranged to contact said cam surface, to lock said weight to said body and prevent flexing of said diaphragm.

6. The structure of claim 1, in which each of said jaws is provided with means for locking it in a predetermined radial position on said ring.

7. The structure of claim 1, in which said jaws are radically positioned on said ring and each said jaw is individually secured to said ring.

8. The structure of claim 1, including pilot means coacting between said diaphragm and said piston for guiding said piston.

9. The structure of claim 1, in which said body is provided with means for securing it to a machine spindle, and said body is provided with a bore for receiving said piston, there being means on said diaphragm for guiding the said piston as it travels in said bore.

10. A chuck, comprising the combination of a body member, with means for securing it to a machine spindle, a diaphragm secured around its periphery to said body member, a bore in said body member, a piston reciprocable in said bore and arranged to flex said diaphragm, a dovetail ring integrally formed on said diaphragm and having an opening therein for receiving and removing chuck jaws, and a plurality of chuck jaws radially positioned and individually secured to said ring.

11. The structure of claim 10, including centrifugally operating locking means for preventing the flexing of said diaphragm when the chuck is in rotation.

References Cited in the file of this patent

UNITED STATES PATENTS

| | | |
|---|---|---|
| 994,911 | Dusenbery | June 13, 1911 |
| 2,491,611 | Hohwart | Dec. 20, 1949 |
| 2,716,554 | Lowe | Aug. 30, 1955 |
| 2,933,320 | Lyons | Apr. 19, 1960 |